O. E. W. WELANDER.
NUT LOCK.
APPLICATION FILED JAN. 13, 1916.
1,228,624.
Patented June 5, 1917.
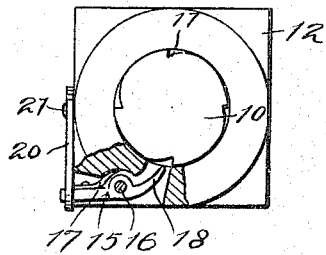
Fig. 1.
Fig. 2.
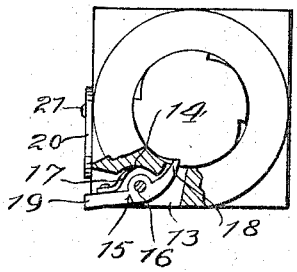
Fig. 3.
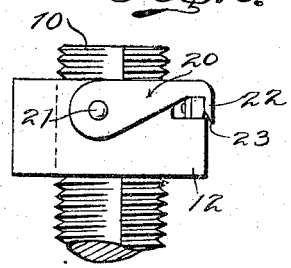
Fig. 4.
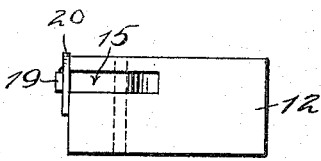
Witnesses
Edw. S. Hall.
Wade Koontz
Inventor
Oscar E. W. Welander.
By Richard B. Owen.
Attorney

UNITED STATES PATENT OFFICE.

OSCAR E. W. WELANDER, OF BALATON, MINNESOTA.

NUT-LOCK.

1,228,624.      Specification of Letters Patent.      Patented June 5, 1917.

Application filed January 13, 1916. Serial No. 71,975.

*To all whom it may concern:*

Be it known that I, OSCAR E. W. WELANDER, a citizen of the United States, residing at Balaton, in the county of Lyon and State of Minnesota, have invented certain new and useful Improvements in Nut-Locks, of which the following is a specification.

This invention relates to nut locks and the object of the same is to provide an improved form of nut having a pivoted pawl for engagement with teeth formed on the bolt so as to prevent the independent rotation of the nut in one direction on the bolt.

Another object of this invention is to provide an improved form of nut as above set forth that has means thereon that will retain the pivoted pawl in such a position as to allow for the rotation of the nut on the bolt in either direction, thus facilitating the placement or removal of the nut upon the bolt.

A still further object of the invention is to provide a nut lock of the kind above set forth that is simple in construction, efficient in operation, and consists of a minimum number of parts.

With these and other objects in view, this invention resides in certain novel features of construction, combination and arrangement of parts as will be hereinafter more fully described and claimed and shown in the accompanying drawings wherein:—

Figure 1 is a top plan view of the improved nut and bolt with a portion thereof shown in section;

Fig. 2 is a view similar to Fig. 1 with the pawl and pawl retaining means shown in a different position than in Fig. 1;

Fig. 3 is a side elevational view of the nut and a portion of the bolt showing the pawl retaining means;

Fig. 4 is a view in elevation of the improved nut taken at right angles to that as shown in Fig. 3.

Referring to the parts by reference numerals, the bolt is designated by the numeral 10 and is provided with ratchet grooves 11 forming teeth and threaded on this bolt 10, is a nut 12. This nut 12 is provided with a recess 13 having a pocket 14 running therefrom, the same provided with a curved wall for a purpose to hereinafter appear. A pawl 15 is pivotally secured in the recess 13 by means of the pin 16 and has a spring 17 secured to one end thereof by any suitable means, the said spring 17 having its free end in engagement with the curved wall of the pocket 14. One end of the pawl is designated by the numeral 18, the said end adapted for engagement with the ratchet teeth 11 formed on the nut 10 to prevent the independent rotation of the nut 12 in one direction and the opposite end of the pawl is designated by the numeral 19, the said end being in engagement with the spring 17 and is normally urged by the spring to a position as shown in Fig. 2, thus moving the end 18 normally into engagement with the bolt 10.

The end 19 of this pawl 15 extends beyond the outer face of the bolt 12 and a catch 20 is pivoted to one of the side faces of the bolt 12 by means of the pin 21. The projecting portion of the end 19 of the pawl 15 is in the path of the hook 22 of the catch 20 and when it is desired to remove the end 18 of the pawl 15 from engagement with the bolt 10, it can be accomplished by the engagement of the hook portion 22 of the catch 20 with the projecting portion of the pawl 15. This catch will retain the pawl in a position as shown in Fig. 1 against the tension of the spring 17.

From the foregoing, it will be seen that an efficient nut lock has been provided that can quickly and easily be threaded on the bolt to the desired position and then locked from independent rotation on the bolt in one direction, this being accomplished by merely releasing the hook portion 22 of the catch 20 from engagement with the end 19 of the pawl 15. It is to be further set forth that the hook portion 22 of the catch 20 is provided with a beveled face 23 so as to ride the edge of the pawl 15 and position the end of the pawl beneath the hook as is shown in Fig. 3.

It is obvious that minor changes may be made in the form and construction of this device, without departing from the material parts thereof. It is, therefore, not wished to confine the invention to the exact form and construction herein described and claimed, but it is wished to include all such as properly comes within the scope claimed.

What is claimed is:—

In combination with a bolt, of a nut carrying a pivoted pawl means in engagement with said pawl for normally urging one end thereof in engagement with said bolt to prevent the independent rotation of said nut on said bolt and a pivoted catch on said nut having a hook end provided with a beveled face, said beveled face adapted to guide said hook over a portion of said pawl to position the same in said hook and move one end thereof out of engagement with said bolt to allow the free movement of said nut upon said bolt.

In testimony whereof I affix my signature in presence of two witnesses.

OSCAR E. W. WELANDER.

Witnesses:
HARRY MORGAN,
E. A. ROLLOFF.

Copies of this patent may be obtained for five cents each, by addressing the "Commissioner of Patents, Washington, D. C."